Aug. 10, 1943.   L. J. ROOT   2,326,567
DRIVE MEANS FOR PROPELLER DRIVEN CRAFT
Filed June 4, 1941   3 Sheets-Sheet 3
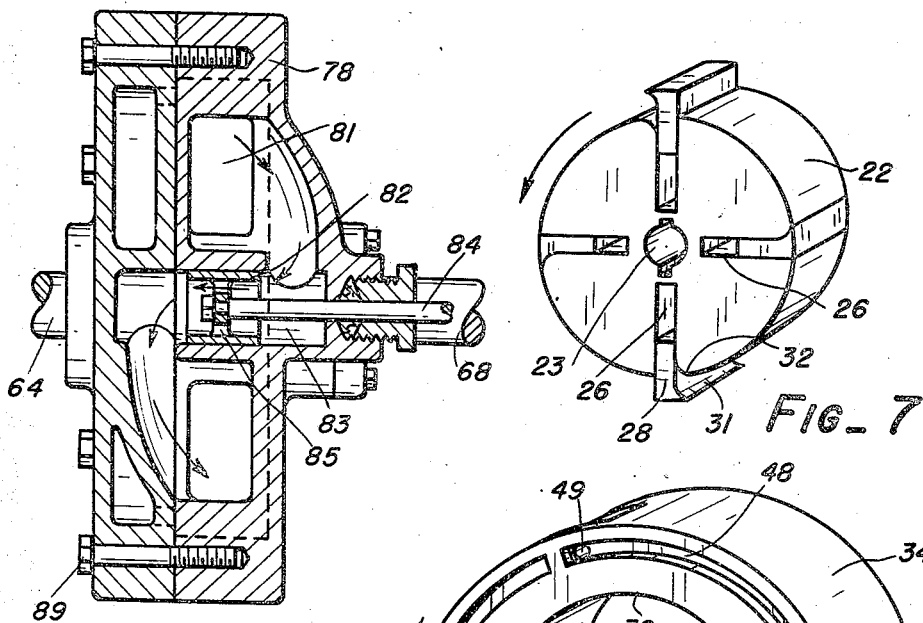
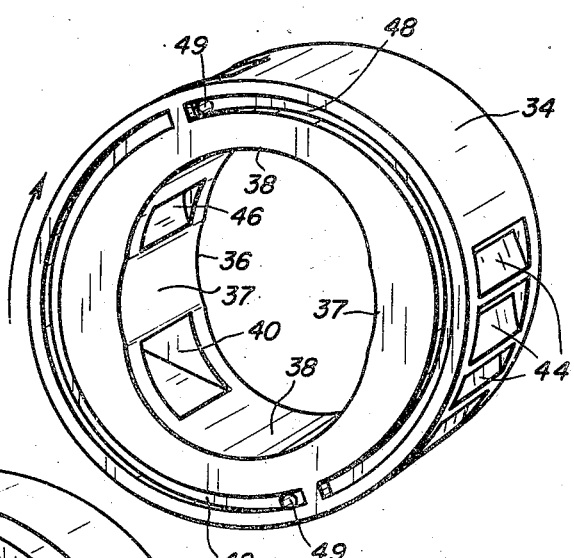
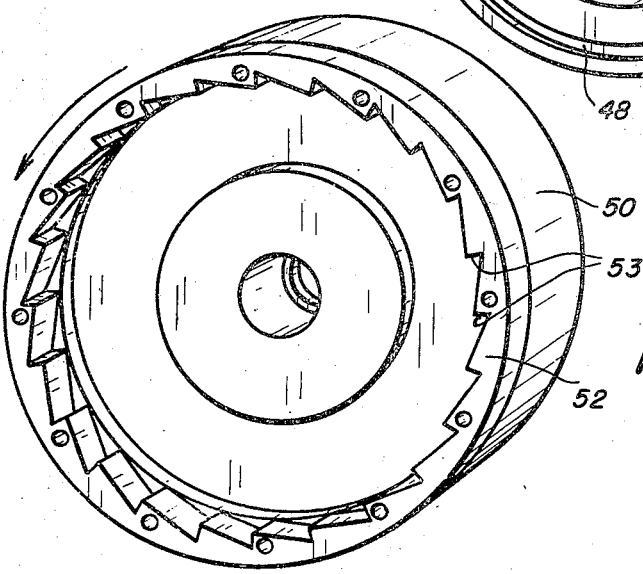
LEMMA J. ROOT
INVENTOR Patented Aug. 10, 1943

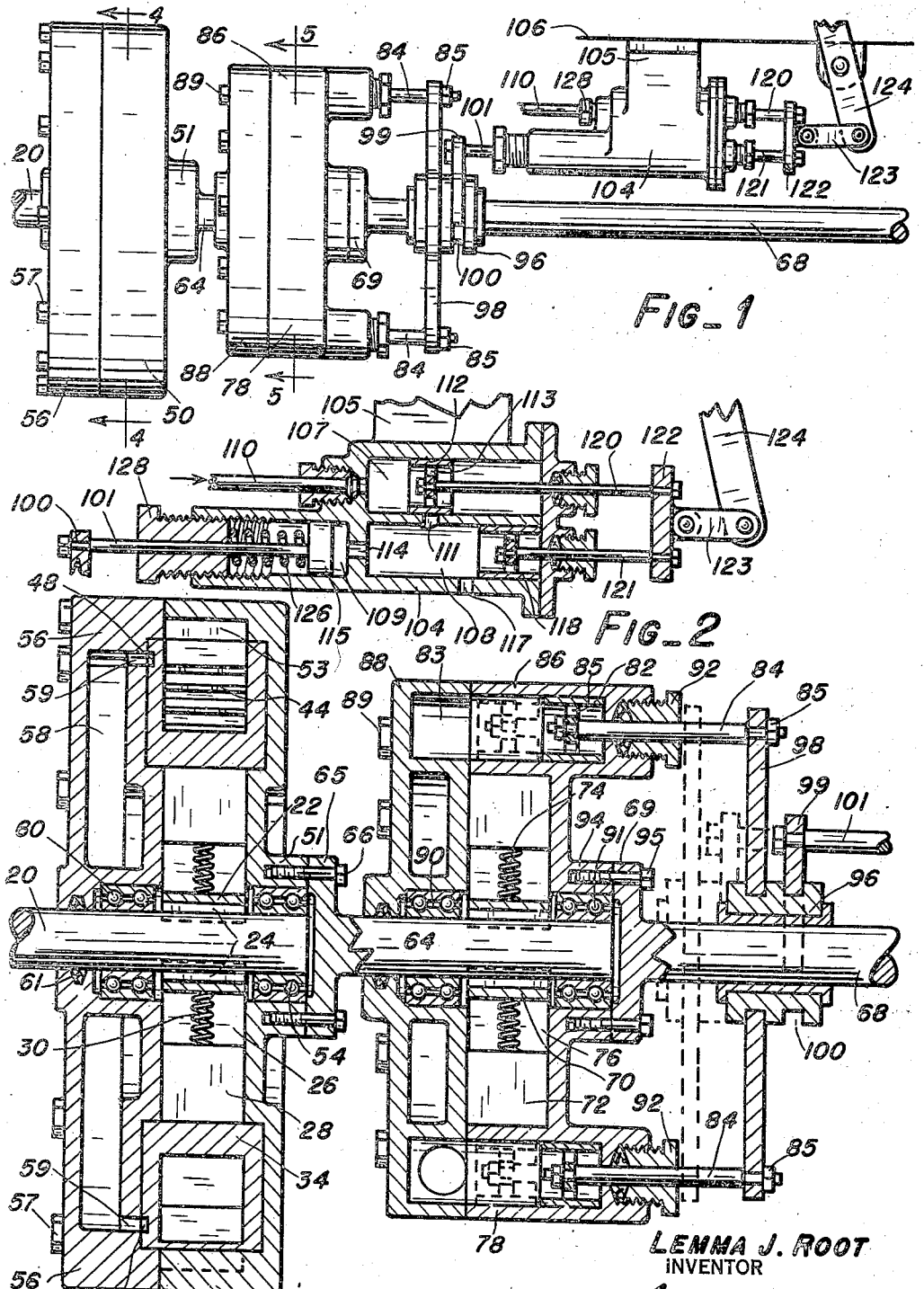

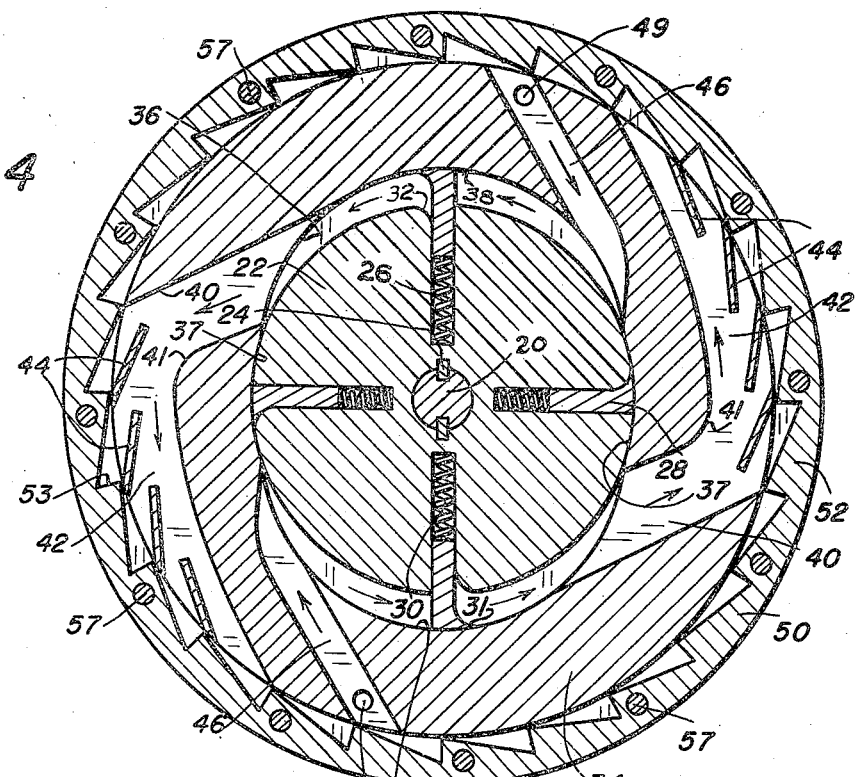
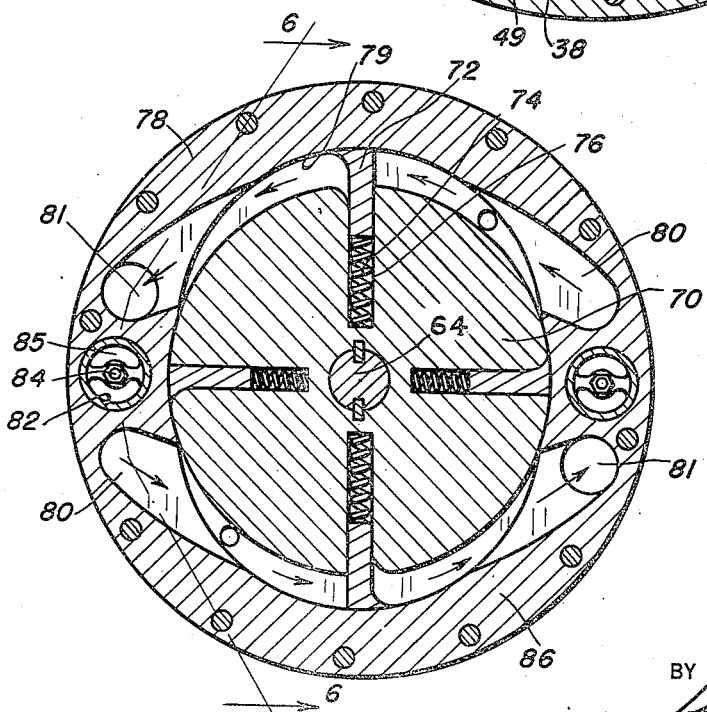

2,326,567

UNITED STATES PATENT OFFICE 2,326,567

DRIVE MEANS FOR PROPELLER DRIVEN CRAFT

Lemma J. Root, Bothell, Wash.

Application June 4, 1941, Serial No. 396,575

2 Claims. (Cl. 60—54)

This invention relates to drive means for propeller driven craft and the like and includes means adapted to employ power produced in a conventional power plant and transmit that power from the drive shaft of the power plant to a transmission mechanism of a fluid torque type under control of a clutch means embodying a modified form of fluid torque movement, the latter of which may be remotely controlled and the power thus transmitted eventually employed in an improved power saving propulsion member of novel design and construction.

The primary object of my invention is to produce driving means giving greater speed and maneuverability to propeller driven craft than has heretofore been obtainable in the conventional arrangements.

In carrying out my invention I use an automatic fluid overdrive having a rotor coupled to a drive shaft of a power plant which rotor is enclosed within a free-floating rotary member that has an inner contour adapted to vary and regulate the operation of radially divergent vanes in the rotor. Thus when the rotor and free-floating member is enclosed within a fluid tight housing which is filled with pressure transmitting fluid such as oil and the rotor rotated oil pressure produced by the rotation of the vanes will be directed by the free-floating member and passages provided therein against fluid pressure seating cups interior of the housing. The housing in that case is connected to a driven shaft that is releasably connected to a propeller shaft by a clutch device capable of remote control in the craft in which the structure is employed.

An important object of my invention is the provision of improved and simplified fluid torque transmission mechanism for driving propeller driven craft which mechanism is simple to manufacture, easy to operate and requires the minimum of maintenance under the most extreme conditions of use.

Another object of my invention is to provide an improved rotor and free-floating member within a fluid drive housing in the production of an efficient and extremely useful fluid transmission overdrive mechanism.

A further object of my invention relates to the provision of fluid controlling means adapted to regulate the application of the rotary power from the transmission mechanism to a propeller shaft in a power driven craft.

Still another object of the invention relates to the provision of an improved casing adapted to be driven by fluid pressure supplied thereto for transmission to a driven shaft coupled to said casing.

Other objects and advantages of the invention will be more apparent during the course of the following description wherein I have shown and illustrated a preferred form of my invention together with slightly modified forms.

In the drawings:

Figure 1 is a side elevational view of my fluid transmission mechanism with certain control mechanism associated therewith.

Figure 2 is a medial sectional view of the valving arrangement adapted for use in operating the control mechanism of the power transmission device.

Figure 3 is a longitudinal sectional view of the transmission mechanism and its control device, Figure 4 is a cross-sectional view taken on line 4—4 of Figure 1, Figure 5 is a cross-sectional view taken on lines 5—5 of Figure 1, Figure 6 is a sectional view taken on line 6—6 of Figure 5, Figure 7 is a perspective view of the driving rotor of my invention, Figure 8 is a perspective view of the free floating fluid directing member of my invention, and Figure 9 is a perspective view of the driven casing of my invention.

Referring to the drawings, throughout which like reference characters indicate like parts, the numeral 20 designates a drive shaft having a source of power such as a motor or the like coupled thereto for revolving such shaft with force and energy.

A cylindrical rotor 22 having a central opening 23 is keyed to the shaft 20 by keys 24 so that it may rotate with the shaft. A plurality of divergently disposed slots 26 are provided in the rotor 22 for the reception in each slot of a vane as 28. By means of springs 30 the vanes 28 are constantly urged outwardly from the axis of member 22 for a purpose later to be described. Under certain conditions the vanes 28 are provided or have a curved lip 31 along one edge thereof and in such case the member 22 is adapted to accommodate the curved lip 31 as shown at 32 in Figure 7.

It is to be noted that when the rotor 22 is revolved with speed the springs 30 will force the vanes outwardly therefrom but that also centrifugal force will act upon the vanes to constantly urge them away from the axis of the rotor.

A free-floating member 34 is employed in connection with the rotor 22 and substantially encloses said rotor around its periphery. The member 34 is provided with a central opening 36 that is substantially oval which has a wall portion 37, 37 that are concentric with the axis of rotation of the member and wall portions 38, 38 that are eccentric to the axis of member 34. This is clearly illustrated in Figures 4 and 8 where it can be seen that when the rotor is fitted into the member 34 two of the vanes will be compressed into their slots while the remaining pair of vanes will be extended in their slots—a distance limited by the eccentricity of the opening 36 at its ends. Of course as the rotor revolves with relation to the floating member 34 the extension and retraction of the vanes will vary slightly due to the varying contours of the opening 36.

Approximately tangential of the ends of the openings 38 are the major fluid passages 40 which may curve at 41 so that the discharge portion 42 lies in an angular relation to the passage 40 and approaches concentricity with the outer periphery of the member 34.

Angularly disposed in the discharge portion 42 and across the outer face of the member 34 is a plurality of directional vanes 44. Inflowing passages 46 are provided from the outer periphery of the member 34 and as can be seen in Figure 4 they lie spaced to the passage 42. In one face of the member 34 I form grooves 48, 48 which extend concentric to the outer edge of the member 34 and oil or other transmission fluid that is picked up in the groove 48 may be passed into the interior of the floating member through passages 49, 49 which discharge into the passages 46 through which the inflowing stream of fluid is passed.

Enclosing the rotor and the floating members 34 is a turbine housing 50 that has a hub 51 and is provided with a flange 52. The flange 52 has an inner face formed with a plurality of cups 53 sequentially arranged and lying in substantial alignment with the discharge openings between the vanes 44 in the passage 42 of the free floating member.

A bearing 54 on the shaft 20 supports the hub 51 of the rotary turbine housing for free rotation. The open face of the housing 50 is closed by the cap member 56 and bolts 57 passing through the cap member, secure the two together. A reservoir 58 within the member 56 is provided with discharge openings 59 that permit the flow of fluid from within the storage chamber to the groove 48 and for subsequent introduction into the rotor.

A bearing 60 on the shaft 20 supports the member 56 for free rotation thereon and an oil seal is indicated at 61 to prevent the leakage of the fluid from within the casing. To the hub 51 I have attached the driven shaft 64 and in the case of the showing of Figure 3, the shaft 64 is flanged at 65 and secured by means of bolts 66 to the hub 51. The shaft 64 could be coupled to any differential mechanism or other mechanism to which power is to be applied for any given purpose.

In certain applications of my invention it is advisable to couple the driven shaft 64 to the ultimate driven member or mechanism which is represented by the shaft 68, through means which will permit the idling of shaft 64 and, on occasion, will permit the coupling of shaft 64 to shaft 68 in a direct drive. To accomplish this controlled coupling of shafts 64 and 68 I have found it expedient to key a rotor 70 to the shaft 64 and the rotor 70 is provided with vanes 72 that are urged outwardly by centrifugal force and also by springs 74 in the slots 76. A housing 78 enclosing the rotor has a substantially oval interior opening 79 of the nature of the opening 36 in member 34. The functions of the vanes 72 are accomplished in substantially the same manner as that of the vanes in the device of Figure 4.

Fluid contained within the housing is permitted to flow freely through passages 81 when the valve member 82 in the interconnecting passage 83 is in the position shown in Figure 6. The valve member 82 is a hollow cylinder having a central web to which the operating rod 84 is connected. Ports 85 on either side of the web permit the flow of fluid therethrough. When the valve member 82 is withdrawn in the passage 83 to the right as is shown in Figure 3, fluid may not flow therethrough as the valve member is seated across the end of the fluid conduit and the rotor (through the restricted flow of the fluid contained within the device), is locked to the outer housing 86. The open face of the housing is closed by the cap member 88 that is fastened in place by bolts 89. Suitable bearings are provided at 90 and 91 so that the members 86 and 88 may rotate freely on the shaft 64.

The valves 82 may be shifted in their passage by the rods 84 that pass through the gland nuts 92. The shaft 68 by means of the flange 69 is coupled to the hub 94 of the housing member 86 by bolts 95. When the housing 86 is rotated with the fluid locked against free-flow the shaft 68 is rotated.

A collar 96 floats on the shaft 68 and carries the arms 98 that extend outwardly therefrom connecting at their outer ends to the valve rods 84 to which they are attached by nuts 85 or other similar means. A shifting fork 99 is provided for engagement in the groove 100 of the sleeve 96 and the rod 101 is secured to the fork for shifting the arms 98 from the dotted line position to the solid line position of the showing in Figure 3.

The operation of the automatic fluid overdrive can best be described as follows: Where power is applied to the rotor to drive it in a rotary manner, the centrifugal extendable vanes travel into the eccentric areas of the inner opening of the free-floating member to create pressure on their forward faces and suction on their rear faces. That pressure exerted on forward face of the vane flows outwardly through the passage composed of the elements 40 and 42 which is adapted to convey the fluid pressure to act on a plurality of turbine cups 53, and brings about rotation of the member 50.

The member 50 with its inner turbine cups 53 rotates by reason of fluid under pressure being directed against the cups. It will often rotate faster than the member 34 and thus bring certain of the cups under or in line with the passages 46 so that the oil therein can escape and be drawn to the back side of the vanes under the urgence of the vacuum created by the rotary motion of said vanes.

The action of the compressed fluid on the plurality of cups of the turbine rotor is directed against the bottom faces of the cup by the divider members 44 so that they can operate efficiently to produce rotation in the member 50.

In constructing such devices, varying the distance of the cup 53 from the center of the axis 20 in proportion to the diameter of the rotor 22 and the vanes therein, produces a mechanical advantage of the device to increase or decrease the speed and torque of the member 50.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. A fluid torque transmission mechanism adapted to be coupled between a power plant and shaft to be driven thereby and comprising a driven rotor whose outer face forms the inner periphery of a plurality of pump chambers, a plurality of radially extendable vanes on said rotor, a free floating ring member mounted for rotation about the axis of said rotor and having inner eccentric cut out portions forming pump chambers in which said vanes may extend outwardly from said rotor, said ring member having fluid passages extending from said chambers to the outer face thereof, a casing enclosing said rotor and said ring member and having a plurality of turbine cups around the inner periphery adapted to be acted upon by fluid exhausted from the pump chambers of said ring member.

2. A fluid torque transmission mechanism adapted to be coupled between a power plant and shaft to be driven thereby and comprising a driven rotor whose outer face forms the inner periphery of a plurality of pump chambers, a plurality of radially extendable vanes on said rotor, a free floating ring member mounted on said rotor for independent rotation about the axis thereof and having inner eccentric cut-out portions forming pump chambers about said rotor in which said vanes may extend outwardly from said rotor, said ring member having fluid passages extending from said chambers to the outer face thereof, a casing enclosing said rotor and said ring member and having a plurality of turbine cups around the inner periphery adapted to be acted upon by fluid exhausted from the pump chambers of said ring member, said fluid passages from the pump chambers to the turbine cups having an outer end adapted to embrace simultaneously a plurality of said cups.

LEMMA J. ROOT.